(12) United States Patent
Suzuki

(10) Patent No.: US 6,206,527 B1
(45) Date of Patent: Mar. 27, 2001

(54) DEVICE FOR OBLIQUE LIGHT IRRADIATION

(75) Inventor: Shinji Suzuki, Kawasaki (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/448,481

(22) Filed: Nov. 24, 1999

(30) Foreign Application Priority Data

Nov. 24, 1998 (JP) .................................................. 10-332558

(51) Int. Cl.[7] ....................................................... G02B 5/10
(52) U.S. Cl. ........................ 359/858; 359/859; 359/856; 359/857
(58) Field of Search ..................... 359/858, 859, 359/856, 857, 862, 865, 850

(56) References Cited

U.S. PATENT DOCUMENTS

| | | | |
|---|---|---|---|
| 4,605,290 | * 8/1986 | Burns | 359/858 |
| 5,864,388 | * 1/1999 | Shima et al. | 355/53 |
| 5,889,571 | 3/1999 | Kim et al. | 349/124 |

FOREIGN PATENT DOCUMENTS

| | | |
|---|---|---|
| 2 678 746 | 1/1993 | (FR) . |
| 10-154658 | 6/1998 | (JP) . |
| WO 86/05940 | 10/1986 | (WO) . |

* cited by examiner

*Primary Examiner*—Cassandra Spyrou
*Assistant Examiner*—Mohammad Y. Sikder
(74) *Attorney, Agent, or Firm*—Nixon Peabody LLP; David S. Safran

(57) ABSTRACT

To freely adjust the angle of the light incident on a workpiece in a light irradiation part for oblique irradiation of the workpiece with light without needing to move a large light irradiation part, on the exit side of a collimation lens or a collimation mirror, in a light irradiation part, there is a flat mirror which is moved in the direction in which the length of the optical path of the irradiation light is changed, such that its angle is changed with respect to the optical axis, and at the same time, the center of an area to be irradiated by reflection of the flat mirror essentially does not move. Thus, the angle of the light incident in the workpiece can be changed. Furthermore, by changing the angle of the collimation mirror with reference to the optical axis and by moving the collimation mirror in the direction in which the length of the optical path of the irradiation light is changed, the angle of the light incident in the workpiece can be changed without using a flat mirror.

8 Claims, 5 Drawing Sheets

DEVICE FOR OBLIQUE LIGHT IRRADIATION

BACKGROUND OF THE INVENTION

1. Field of the Invention

The invention relates to an exposure device. The invention relates especially to a device for oblique light irradiation which is used for an exposure device or the like in which an alignment layer of a liquid crystal display (LCD) element is irradiated with UV radiation and optical alignment of the liquid crystals is performed.

2. Description of Related Art

To establish the size and the direction of the pre-tilt angle of an optical alignment layer of a liquid crystal display element, a process was proposed in which the liquid crystal display element, as a workpiece, is obliquely irradiated with UV radiation (for example, see FIG. 1 of published Japanese Patent Application HEI 9-211465; U.S. Pat. No. 5,889,571).

The angle of the light incident on the workpiece is different depending on the type of optical alignment layer and the treatment conditions of the other production processes. In a device in which a workpiece is obliquely irradiated with light, and is thus exposed (one such exposure device is called a "device for oblique exposure"), there is a need for free adjustment of the angle of the irradiation light incident in the workpiece.

In the above described device for oblique irradiation, a process for oblique irradiation can be imagined in which a light irradiation part (lamp housing) itself is obliquely angled with respect to the workpiece, as is shown in the above-mentioned figure of published Japanese Patent Application HEI 9-211465.

Furthermore, in published Japanese Patent Application HEI 10-154658 (allowed, commonly owned, co-pending U.S. patent application Ser. No. 09/025,732), a device is shown in which a light irradiation part is provided with an arc-shaped rail and is angled without the lamp itself being tilted.

A light irradiation part (lamp housing) comprises a lamp, a focusing mirror, which focuses the light from the lamp and converts it into parallel light, a collimator and optical elements for deflecting the optical path, such as a reflector or the like.

In the case of the above described light irradiation part in published Japanese Patent Application HEI 10-154658, only a small light irradiation part is needed if the area to be irradiated with light is relatively small. Therefore, a large device for tilting the light irradiation part is not needed either.

Liquid crystal display elements with large substrates of 550×650 mm and 650×830 mm sizes have recently become more and more common and increasingly important. When the substrate is enlarged, the area to be irradiated accordingly also becomes larger. The light irradiation part is therefore also enlarged.

The weight of the light irradiation part increases when the latter becomes larger; this causes enlargement of the device for angling the light irradiation part and an enormous enlargement of the entire device.

SUMMARY OF THE INVENTION

The invention was devised to eliminate the above described defect in the prior art. Therefore, a primary object of the present invention is to obtain a compact arrangement in a light irradiation part for oblique irradiation of a workpiece with light, and to freely adjust the angle of the light incident on the workpiece without the need to move a large light irradiation part.

The object is achieved in accordance with the invention as follows:

(1) On the exit side of a collimation lens or a collimation mirror of a light irradiation part, there is a flat mirror which is moved by means of a mirror drive device in the direction in which the length of the optical path of the irradiation light is changed, such that its angle is changed with respect to the optical axis, and at the same time, the center of an area to be irradiated by reflection of the flat mirror essentially does not move. Thus, the angle of the reflection light incident in the workpiece is changed by the flat mirror.

(2) There is a mirror drive device which drives a collimation mirror. By means of the mirror drive device, the collimation mirror is moved in the direction in which the length of the optical path of the irradiation light is changed such that its angle is changed, and at the same time, the center of the area to be irradiated by reflection from the collimation mirror essentially does not move. Thus, the angle of the reflection light incident in the workpiece is changed by the collimation mirror.

(3) In (1) and (2), the mirror drive device is comprised of guide components for attaching the above described flat mirror and the collimation mirror, and of a curve-like guide, the guide components being movable along a curve-like guide.

(4) In (1) and (2), the mirror drive device is comprised of a frame which can be moved in the direction of the optical axis of the irradiation light and on which the flat mirror or the collimation mirror is supported to be swivelled.

In the following, the invention is specifically described using several embodiments shown in the drawings.

BRIEF DESCRIPTION OF THE DRAWINGS

FIG. 2(*b*) shows a schematic of the center of the area to be irradiated in the case of changing the angle of the flat mirror;

DETAILED DESCRIPTION OF THE INVENTION

Figure 1:
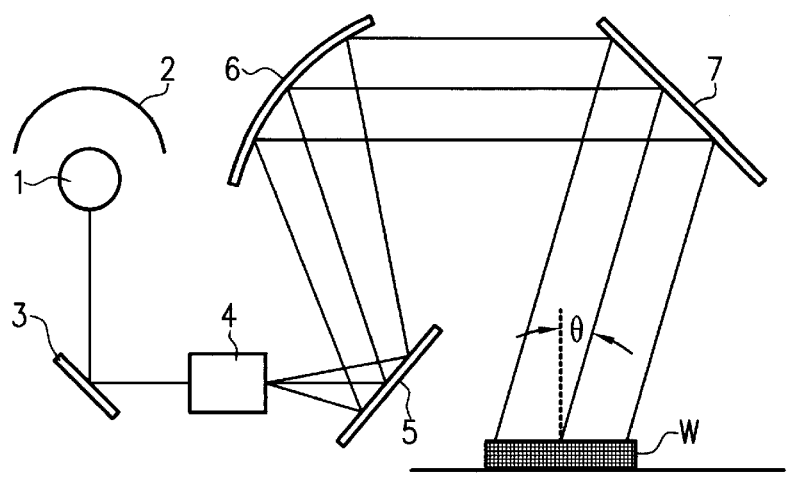
FIG. 1 shows a schematic of a first embodiment of the invention.

FIG. 1 shows the arrangement of a first embodiment of a light irradiation device in accordance with the invention. In the figure, light is emitted from a lamp 1 and is focused by a focusing mirror 2, reflected by a first flat mirror 3 and is incident in an integrator lens 4. The light emerging from the integrator lens 4 is incident via a second flat mirror 5 in a collimation mirror 6, is converted into parallel light by means of the collimation mirror 6, is reflected by a third flat mirror 7 and is obliquely incident on a large workpiece W, for example, a liquid crystal substrate or the like. Furthermore, instead of the above described collimation mirror 6, a collimation lens can be used.

Figure 2A:
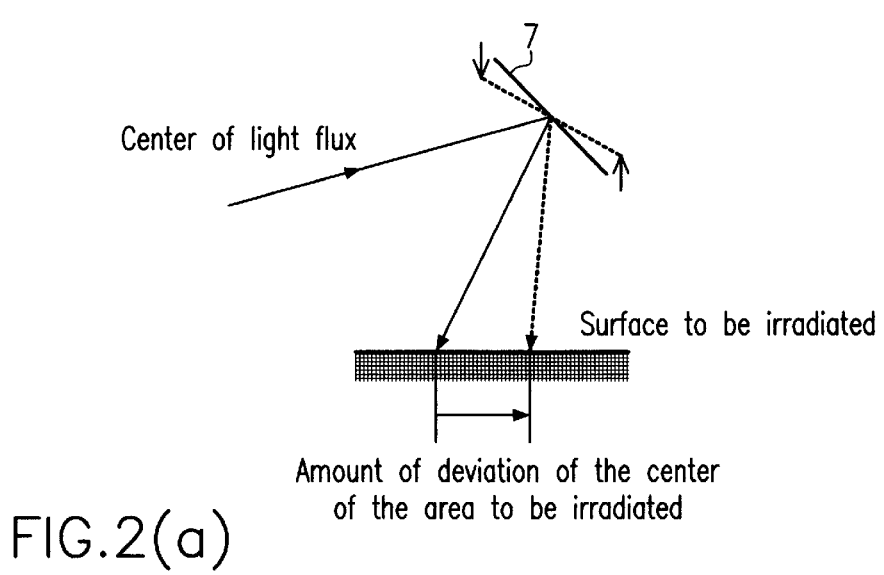
FIG. 2(*a*) shows a schematic of a center of the area to be irradiated in the case of changing the angle and the position of the flat mirror.
Figure 2B:
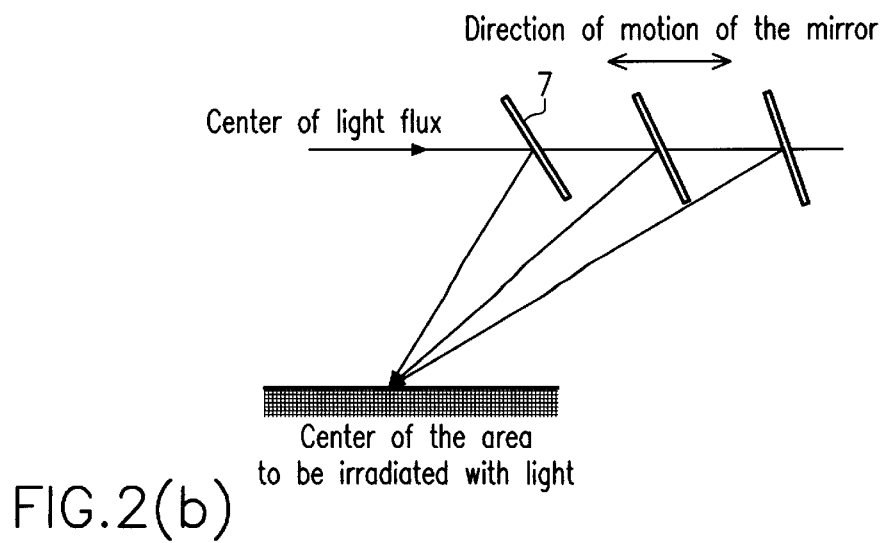

The angle of the third flat mirror 7 (hereinafter called simply a "flat mirror 7") can be changed. By changing the angle of the flat mirror 7 with respect to the optical axis, the angle of the light incident in the workpiece W can be changed. If, in doing so, only the angle of the flat mirror 7 is changed, the middle of the area to be irradiated, which is to be irradiated by reflection from the flat mirror 7 onto the surface to be irradiated, is moved, as is shown in FIG. 2(a). Therefore, according to the angle of the flat mirror 7, the position of the workpiece W must be moved. Thus, in this embodiment, the angle of the flat mirror 7 is changed, and at the same time, the position of the flat mirror 7 is moved such that the distance in the optical path (length of the optical path) from the light source to the workpiece W is changed, so that the center of the area to be irradiated which is formed by reflection from the flat mirror 7 does not move, as is shown in FIG. 2(b).

Figure 3:
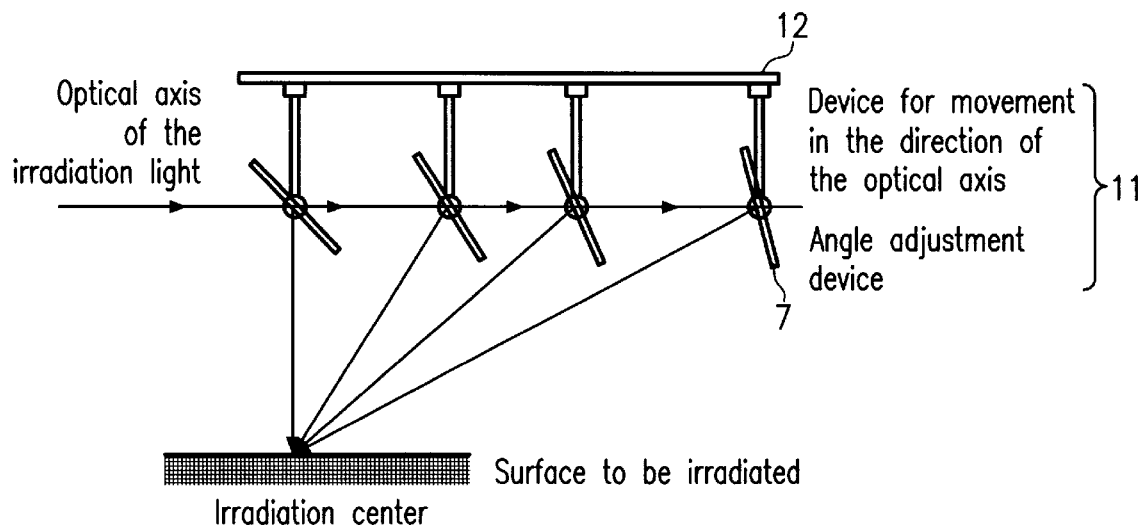
FIG. 3 shows a schematic of a device for changing the angle and the position of the flat mirror in the first embodiment of the invention.

FIG. 3 is a schematic of a device for changing the angle and the position of the flat mirror 7.

As is shown in the drawing, there is a mirror holding part 11 which has a device for angle adjustment and a device for movement in the direction of the optical axis, and which holds the flat mirror 7. While the angle of the flat mirror 7 is adjusted with respect to the optical axis by the device for angle adjustment of the angle of the flat mirror 7, the latter is moved parallel in the direction of the optical axis by the device for movement in the direction of the optical axis on a linear guide 12.

The angle and the position of the flat mirror 7 is thus controlled according to the angle of the light incident in the workpiece W such that the angle of the flat mirror which corresponds to the angle of the light incident in the workpiece W and the position of the flat mirror in the direction of the optical axis are determined beforehand.

Figure 4A:
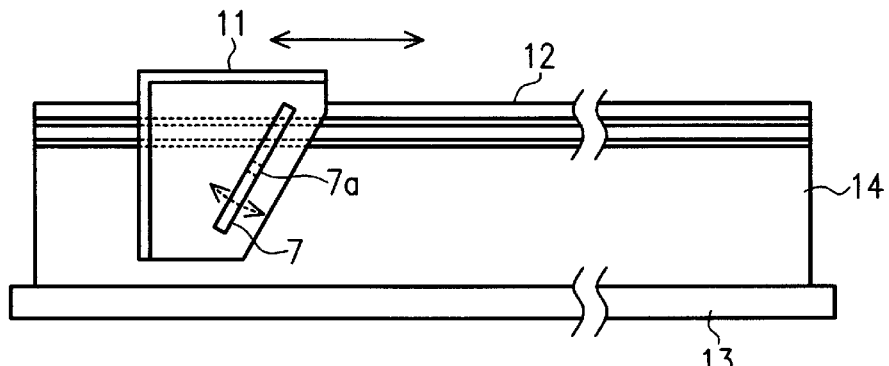
FIGS. 4(*a*) & (*b*) each show a schematic of a specific arrangement of a device for adjusting the angle and the position of the flat mirror in the first embodiment of the invention.
Figure 4B:
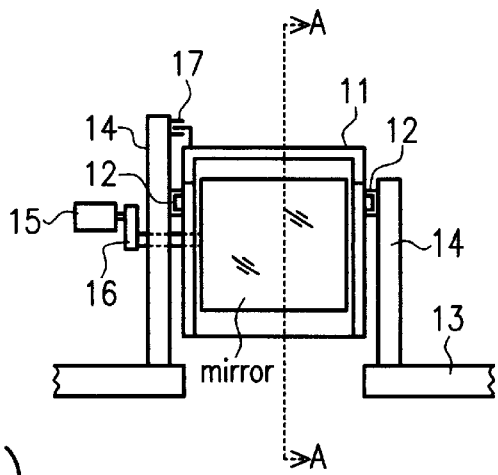

FIGS. 4(a) & 4(b) each show in schematic form a specific arrangement of a device for changing the angle and the position of the flat mirror 7 (hereinafter called the "device for adjusting the angle and the position"). FIG. 4(a) is a schematic in which the device for adjusting the angle and the position is viewed from the direction which orthogonally intersects the direction of motion of the flat mirror 7. FIG. 4(b) is a schematic in which the device for adjusting the angle and the position is viewed from the direction of motion of the flat mirror. FIG. 4(a) is a cross section which corresponds to line A—A according to FIG. 4(b).

In FIGS. 4(a), 4(b), there is a holding component 14 on the base 13 in which a linear guide 12 is installed. In the linear guide 12, a mirror holding part 11 is movably installed and is moved along the linear guide 12 by a device (not shown) for movement in the direction of the optical axis and which has a recirculating ball spindle, a pulley or the like.

In the mirror holding part 11, the flat mirror 7 is pivotally installed; its axis of rotation 7a is connected via gearing 16 to a mirror drive motor 15. The angle of the flat mirror 7 is changed by the drive of the mirror drive motor 15.

On the top of the mirror holding part 11, there is a mirror position sensor 17 by which the position of the flat mirror 7 is determined. Furthermore, on the axis of rotation 7a of the flat mirror 7, an angle sensor (not shown) is installed which determines the angle of the flat mirror. The position and angle of the flat mirror 7 determined by the mirror position sensor 17 and the angle sensor are sent to a control device (not shown).

The control device determines the angle of the flat mirror and the position in the direction of the optical axis which correspond to an output angle of the light incident on the workpiece W. The device for movement in the direction of the optical axis and the mirror drive motor 15 move the mirror holding part 11 along the linear guide 12, and at the same time, change the angle of the flat mirror 7. The control device thus executes control such that the angle and the position in the direction of the optical axis of the flat mirror 7 reach the desired values.

It is enough when gradual control of the angle of the flat mirror 7 is performed with an increment of roughly 5 degrees. Nor is positioning with high accuracy needed to control the position of the flat mirror 7 in the direction of the optical axis. For example, an optical sensor, such as a photosensor or the like, can be used as the mirror position sensor 17 and as the angle sensor.

In this embodiment, as was described above, the flat mirror 7 is located on the outlet side of the collimation mirror or the collimation lens of the light irradiation device, the angle of the flat mirror 7 and its position in the direction of the optical axis are changed, and thus, the angle of the light incident in the workpiece W is changed. Therefore, the angle of the light incident in the workpiece can be freely adjusted without the need to move a large light irradiation part.

In the above described first embodiment, the flat mirror is moved along the linear guide. However, the movement devices for the flat mirror can be simplified by the flat mirror being moved along an arc-shaped guide.

In the following, a second embodiment of the invention is described in which the flat mirror is moved along an arc-shaped guide.

Figure 5:
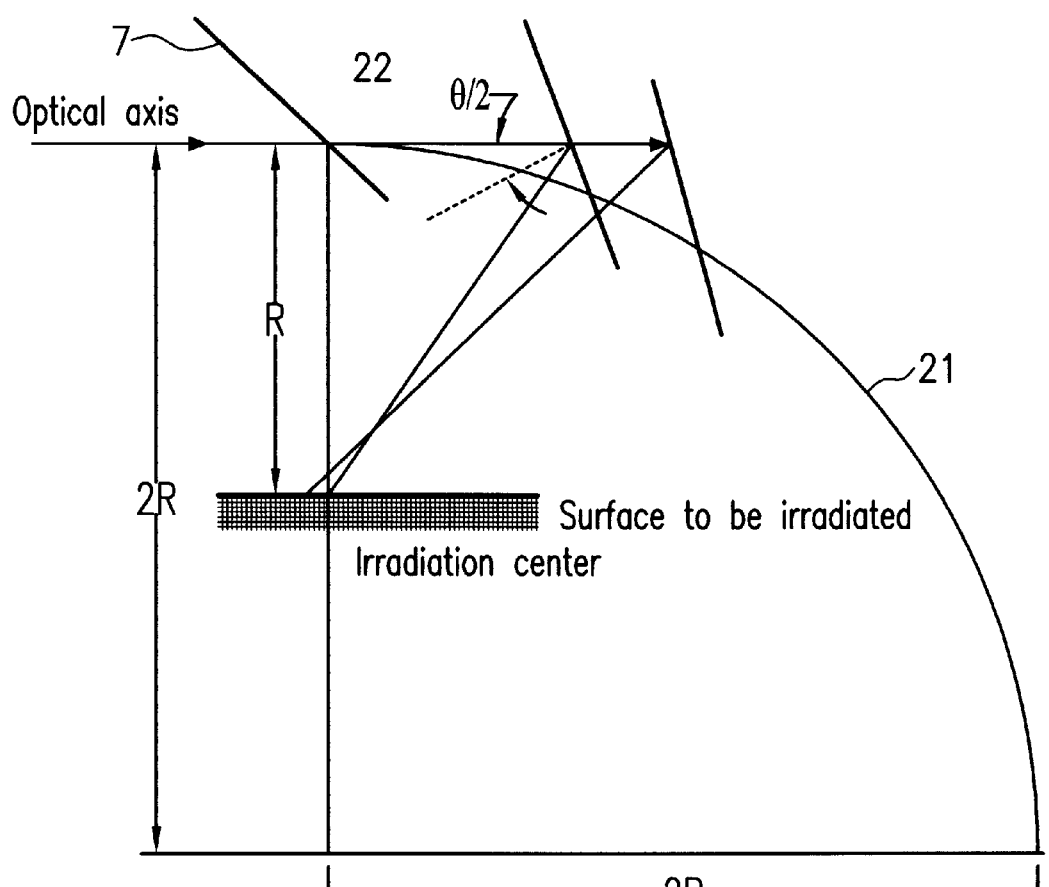
FIG. 5 schematically depicts the position, angle and optical path of the flat mirror in a second embodiment of the invention.

FIG. 5 is a schematic of the position, angle and optical path of the flat mirror 7 in this embodiment.

As is shown in the drawings, a circle with a radius of 2R is assumed, when the distance between the flat mirror 7 in vertical light irradiation of the surface to be irradiated and the surface to be irradiated is labeled R. If the flat mirror 7 moves on the arc of this circle, such that its angle with respect to the tangent of the circle does not change, the angle of the flat mirror 7 with respect to the optical axis and the length of the optical path change. Thus, the angle of incidence with respect to the workpiece can be changed without significantly changing the center of the area to be irradiated on the surface to be irradiated.

Specifically, an R-guide with a radius of 2R is made available. In one movement part, which moves on this R guide, a mirror is installed. The mirror is moved along the R-guide.

In the above described first embodiment, it is necessary to have two devices as the movement device for the flat mirror 7, specifically the device for angle adjustment and the device for movement in the direction of the optical axis. In this embodiment, however, only one device is needed because the movement device moves the flat mirror 7 in an arc along the R-guide, so that the incidence position of the light irradiating the mirror changes when the mirror is moving. In FIG. 5, for example, the flat mirror 7 swings upward and moves downward as it moves to the right in the figure, the position to be irradiated with the light shifting upwards in the flat mirror 7.

In this embodiment, therefore, it is necessary for the area of the flat mirror 7 to be large enough to take into account the size of the beam of irradiation light and the distance that its position shifts in the mirror with respect to the optical axis.

In this embodiment, the center of the area to be irradiated on the surface to be irradiated deviates slightly according to the movement of the flat mirror. Therefore, it is necessary that the area to be irradiated with radiant light be made larger than the surface to be irradiated on the workpiece.

Figure 6:
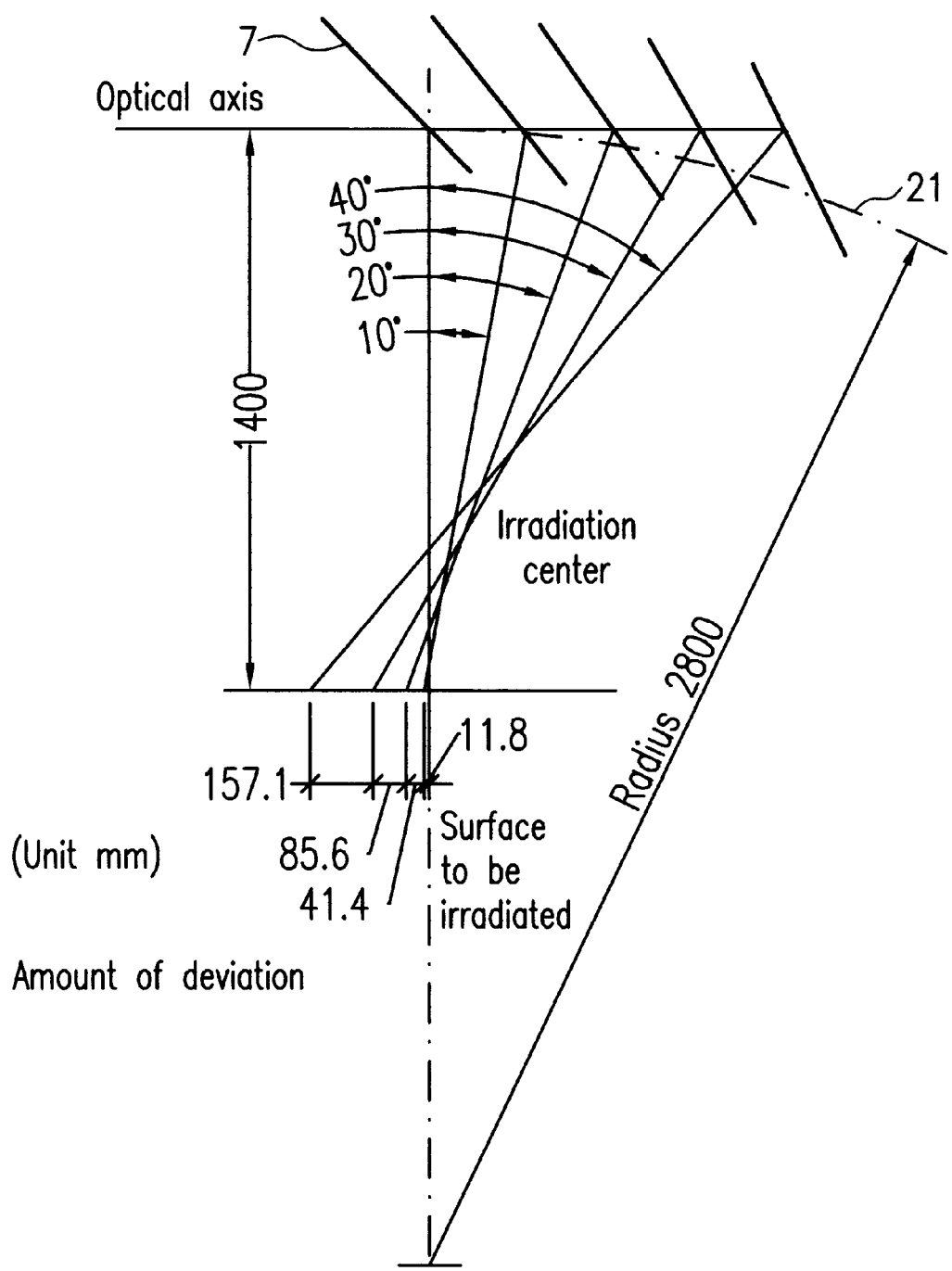
FIG. 6 shows a schematic of the amount of deviation of the irradiation center with respect to a change of the position and the angle of the flat mirror in the second embodiment of the invention.

FIG. 6 shows the amount of that the center of the area to be irradiated with oblique light irradiation of a substrate of greater than or equal to 550 to 650 mm is shifted. In the figure, a case is shown in which at R=1400 mm and the angle of the flat mirror changes from 10° to 40°.

In the case of a substrate with the above described size, the center of the area to be irradiated of roughly 50 mm is able to be shifted. As is apparent from FIG. 6, the R-guide shown in FIG. 5 can be used with a radius of 2R when the angle of the flat mirror 7 is in an angular range from 90° to 70° which has approached the vertical.

The smaller the angle becomes, i.e., the larger the angling of the flat mirror 7 becomes, the greater the amount of movement of the irradiation center becomes, by which the use of the R-guide with a radius of 2R becomes difficult. Therefore, it is necessary to choose the shape of the R-guide with consideration of the distance between the flat mirror 7 and the surface to be irradiated and the oblique angle of irradiation. The R-guide need not necessarily be arc-shaped, but can also be made in the shape of a different curve.

Figure 7A:
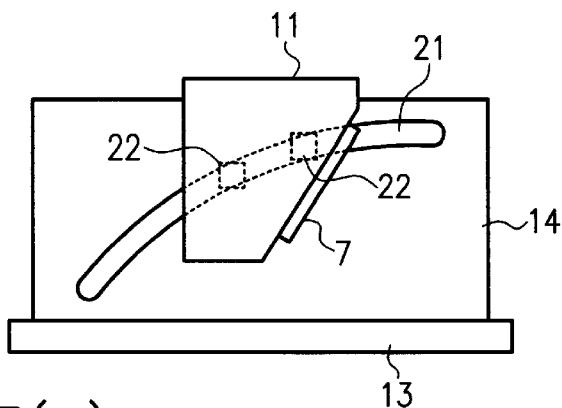
FIGS. 7(*a*) & (*b*) each show a schematic of one specific arrangement of a device for adjusting the angle and the position of the flat mirror in the second embodiment of the invention, FIG. 7(*a*) being a cross section taken along line A—A in FIG. 7(*b*)
Figure 7B:
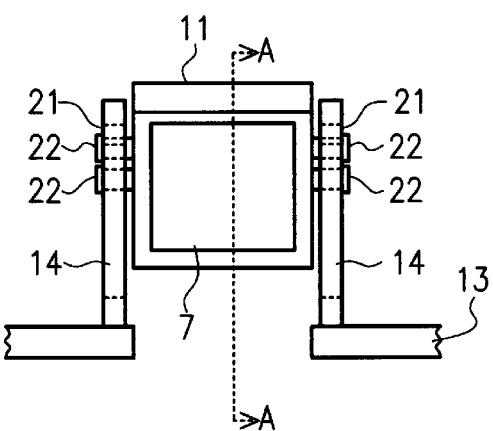

FIGS. 7(a) and 7(b) each schematically show one specific arrangement of a device for moving the flat mirror 7 in this embodiment.

FIG. 7(a) shows the movement device viewed from a direction which orthogonally intersects the direction of movement of the flat mirror 7 while FIG. 7(b) shows the device for adjusting the angle and the position viewed from the direction of motion of the flat mirror.

In FIGS. 7(a) & (b), on the base 13, there is a holding component 14 in which there is an R-guide 21 which is an arc-shaped through opening. On each of the two sides of the mirror holding part 11 in which the flat mirror 7 is installed, two guide components 22 are installed and engage the R-guide 21. The mirror holding part 11 is driven using a drive device (not shown) and moves via the guide components 22 along the R-guides 21.

When the mirror holding part 11 is moved by the drive device, the flat mirror 7 moves such that its angle with respect to a tangent to the R-guide 21 does not change.

In the mirror holding part 11, there is a position sensor (not shown) and its output is sent to a control device (not shown). This control device determines the position of the flat mirror 7 which corresponds to an output angle of the light incident in the workpiece W. Based on the output of the position sensor, the mirror holding part 11 is moved. Thus, the control device executes control such that the position of the flat mirror 7 reaches a desired position.

In the above described embodiment, the flat mirror 7 is located on the output side of the collimation mirror or the collimation lens, and its angle and position are changed so that the angle of the light incident on the workpiece is changed without changing the position of the irradiation center. However, an optical system can be used in which the angle of the collimation mirror with respect to the optical axis and the position with respect to the length of the optical path are controlled without having this flat mirror and in which, without changing the center of the area to be irradiated on the surface to be irradiated, the angle of the light incident in the workpiece is changed.

Figure 8:
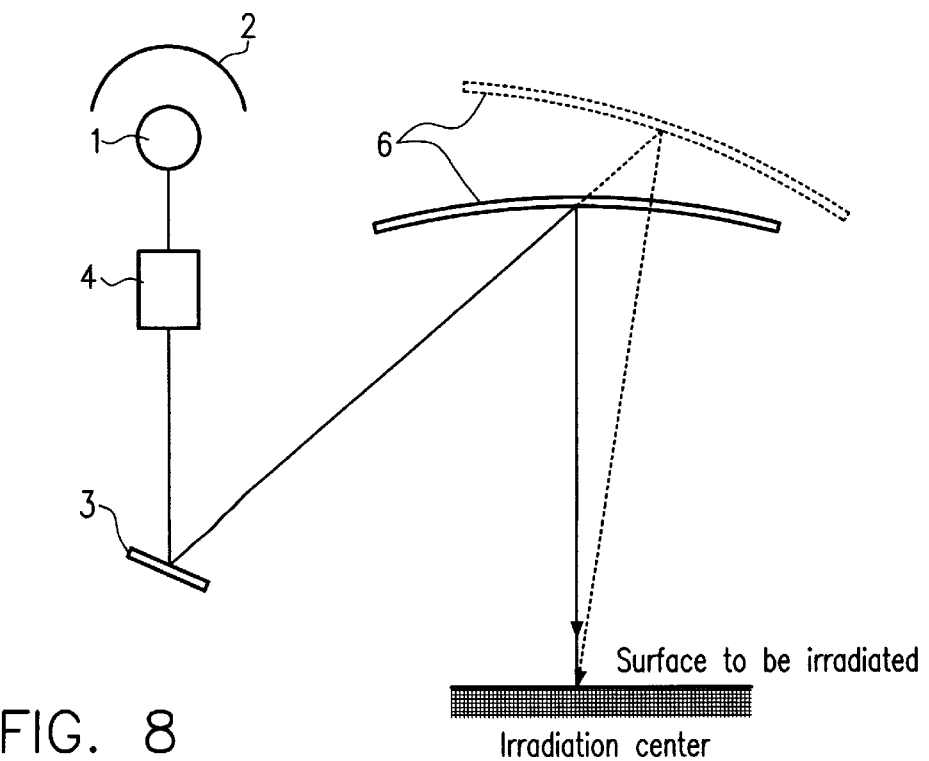
FIG. 8 is a schematic depiction of a third embodiment of the invention.

FIG. 8 shows the above described third embodiment of the invention.

In this figure, the light emitted by a lamp 1 is focused by a focusing mirror 2 and is incident in an integrator lens 4. The light emerging from the integrator lens 4 is reflected by means of a first flat mirror 3, is converted by means of the collimation mirror 6 into parallel light and is obliquely incident in a large workpiece W, such as, for example, a liquid crystal substrate or the like.

The collimation mirror 6, like the flat mirror 7 in the first embodiment, is located to be able to move in the direction of the optical axis and its angle with respect to the optical axis can be changed. By changing the angle and the position of the collimation mirror 6 with respect to the optical axis, the angle of the light incident on the workpiece W can be changed.

As the device for changing the position and the angle of the collimation mirror 6, the same device as in the first or second embodiment can be used. The angle and the position in the direction of the optical axis of the collimation mirror 6 are controlled according to the angle of the light incident in the workpiece W, and thus, the angle of the light incident on the workpiece is changed.

In this embodiment, it is not necessary to have the flat mirror shown in the first and second embodiments because the position and the angle of the collimation mirror 6 are changed in the above described manner and the angle of the light incident on the workpiece W is changed. Thus a simple arrangement can be obtained.

Action of the Invention

As was described above, the following effects can be obtained in the invention:

(1) A smaller drive device for moving the mirror and a more compact arrangement of the entire device can be obtained, as compared to the case of moving the entire light irradiation part, by the measure that the flat mirror or the collimation mirror is moved, and thus, the angle of the light incident on the workpiece is changed.

(2) Changing the angle of the mirror with respect to the optical axis and moving the position of the flat mirror or the collimation mirror such that the length of the optical axis is changed prevent the center of the area to be irradiated from shifting, even if the angle of incidence of the light with respect to the workpiece changes. Therefore, it is unnecessary to move the workpiece.

What we claim is:

1. Device for oblique light irradiation which comprises:
   a lamp for emitting irradiation light which contains UV radiation;
   a focusing mirror positioned in an optical path of the irradiation light emitted by the lamp for focusing the light from said lamp;

an integrator lens positioned to receive light focused by said focusing mirror;

a collimator which converts light emerging from the integrator lens into parallel light;

a flat mirror positioned to receive light from said collimator; and a mirror drive device for driving the flat mirror in a linear direction and an angular direction, wherein angling of the flat mirror is changed by the mirror drive device at the same time that the flat mirror is moved in a direction in which a length of the optical path of the irradiation light is variable, so that an angle by which light is reflected by the flat mirror and at which the light is obliquely incident on a workpiece is variable.

2. Device for oblique light irradiation according to claim 1, wherein said collimator is a collimation lens.

3. Device for oblique light irradiation according to claim 1, wherein said collimator is a collimation mirror.

4. Device for oblique light irradiation as claimed in claim 1, wherein the mirror drive device comprises guide components for attaching the flat mirror and a curve-like guide, the guide components being movable along the curve-like guide.

5. Device for oblique light irradiation as claimed in claim 1, wherein the flat mirror is pivotably supported on the mirror drive device by a frame which is movable in parallel to the optical path of the irradiation light.

6. Device for oblique light irradiation which comprises:

a lamp for emitting irradiation light which contains UV radiation;

a focusing mirror positioned in an optical path of the irradiation light emitted by the lamp for focusing the light from said lamp;

an integrator lens positioned to receive light focused by said focusing mirror;

a collimation mirror which converts light emerging from the integrator lens into parallel light; and a mirror drive device for driving said collimation mirror in a linear direction and an angular direction;

wherein an angle of the collimation mirror is changed by the mirror drive device at the same time the collimation mirror is moved in a direction in which a length of the optical path of the irradiation light is variable, so that the angle of reflection light obliquely incident on the workpiece is changable by the collimation mirror.

7. Device for oblique light irradiation as claimed in claim 6, wherein the mirror drive device comprises guide components for attaching the collimation mirror and a curve-like guide, the guide components being movable along the curve-like guide.

8. Device for oblique light irradiation as claimed in claim 6, wherein the collimation mirror is pivotably supported on the mirror drive device by a frame which is movable parallel to the optical path of the irradiation light.

* * * * *